Feb. 1, 1944.   H. F. REMPT   2,340,560
FLEXIBLE PIPE CLAMP
Filed Aug. 18, 1941
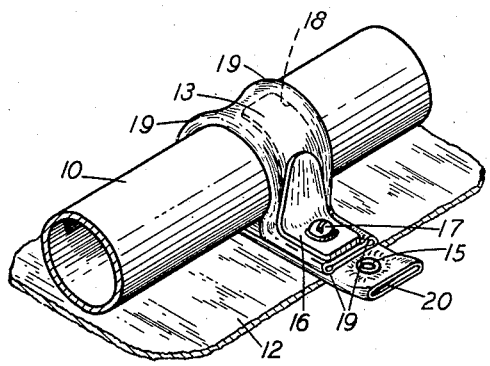
FIG—I
FIG—II
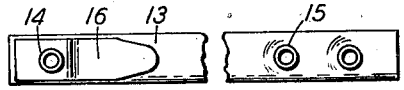
FIG—III
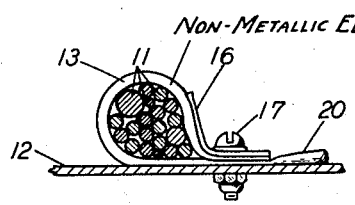
FIG—IV
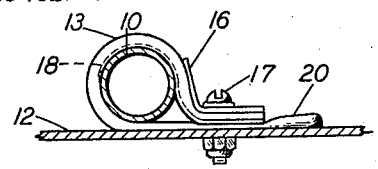
FIG—V
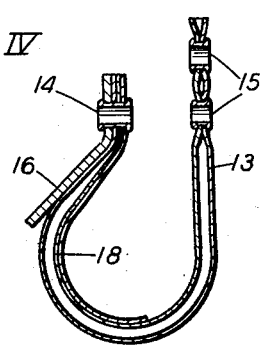
FIG—VI
INVENTOR
Henry F. Rempt Patented Feb. 1, 1944

2,340,560

UNITED STATES PATENT OFFICE 2,340,560

FLEXIBLE PIPE CLAMP

Henry F. Rempt, Van Nuys, Calif., assignor to Lockheed Aircraft Corporation, Burbank, Calif.

Application August 18, 1941, Serial No. 407,286

8 Claims. (Cl. 174—40)

This invention relates to an improved flexible and elastic clamp for pipe, tubing, conduit, and wiring; which clamp also provides for bonding or grounding the material if the latter is metallic or sheathed with metal braid.

While my invention will be described with particular reference to aircraft use and the problems involved in the installation of hydraulic, pneumatic, and electrical conduits, it will be readily appreciated that my invention is not limited to aircraft use but is also especially applicable to automotive and stationary uses where pipe clamps or hangers are required. For aircraft use, lightness is of course essential and electrical bonding or grounding of metallic conduit is also important. Resiliency of the support is also highly advantageous as it suppresses the transmission of vibrations to or from the conduit. It is accordingly an object of this invention to provide an improved non-metallic pipe and conduit clamp that is extremely light in weight, resilient and flexible, and capable of bonding or grounding the pipe or conduit to the structure on which it is mounted.

It has heretofore been proposed to provide metallic clamps coated or sheathed with a rubber-like lining to eliminate abrasion between the clamp and a pipe supported thereby, but such clamps are relatively heavy and rigid and require restoration of the bond destroyed by insulating the metal clamp. Such prior art clamps are also necessarily made in a complete range of individual sizes as they must accurately fit the pipe or conduit to restrain the same.

It is accordingly an object of this invention to provide a non-metallic, flexible and resilient or elastic clamp of the class described wherein one size of clamp will hold a variety of sizes of pipe, or conduit, and that can also be used to hold groups of wires of different sizes without enclosing the same in a conduit, and without abrasion of the wires.

It is a further object of this invention to provide a light and easily installed non-metallic clamp of the type described that can be stocked in the flat condition, and wrapped about round or irregular objects under tension sufficient to firmly support the same.

It is another object of this invention to provide a flexible non-metallic clamp of the class described provided with eyelets for the reception of fastening means, one of said eyelets being adapted to secure a bent metallic tensioning member in place, which member is adapted to apply side and downward pressure to the clamp and object secured thereby as the fastening means is tightened to a firm seat.

It is also an object of this invention to provide an improved non-metallic clamp of the class described wherein eyelets are secured in the ends of a tube of flexible and resilient material, one of said eyelets serving to retain and ground a metallic bonding strip positioned between the clamp and the object engaged thereby.

Other and further important objects of this invention will be apparent from the disclosures in the specification and the accompanying drawing.

This invention in its preferred form is illustrated in the drawing and hereinafter more fully described.

In the drawing—

Figure I is a perspective view of a clamp embodying the feature of this invention, showing it as engaging a tube and fastened to a suitable support.

Figure II is a side elevation of the clamp before its application.

Figure III is a corresponding plan view of the clamp of Figure II.

Figure IV shows the clamp in use with a plurality of electrical wires.

Figure V shows the clamp in use with pipe or tubing, a bonding strip being indicated in dotted lines as in contact with the pipe.

Figure VI is a central section of the clamp partly bent to shape, a bonding strip being shown in connection therewith.

As shown in the drawing—

The clamp of this invention is intended to support a pipe, flexible conduit, or tube 10, as in Figures I and V, or a group of insulated wires 11 as in Figure IV, on or from a structure, such for example as a bulkhead 12. While the bulkhead or support is shown as sheet metal, as would be the case in an all metal airplane, the clamp of this invention is equally usable to engage one pipe to another, or for use with hangers if so desired.

The hanger of this invention is preferably made from extruded tubing 13 of types of synthetic resin plastic that are tough, waterproof, flexible and resilient over a wide range of temperatures, such plastic tubing being available in various opaque and transparent types of resin of various colors as well as clear varieties. The extruded tubing is available in almost any desired length and can conveniently be cut to the desired size either before, during or after the formation of an individual pipe clamp. In order to provide for fastening means, I perforate the tubing near one end for the insertion of an eyelet 14, and for a plurality of eyelets 15 at suitable intervals from the other end. The eyelets hold the adjacent walls of the tube in contact, but slight ridges remain along the folded edges, and before the clamp is wrapped around the tube or pipe it is to support the portions of the tube intervening between eyelets take the form of an ellipse in cross-section.

A bent piece of sheet metal 16 is secured under the eyelet 14 to add side pressure to the clamp to tension the same as the fastening means is tightened down. For sheet metal as shown a bolt 17 forms a suitable fastening although other fastening devices could obviously be used.

If it is desired to bond or ground a metal or metal sheathed conduit through the clamp, as would be done with metallic clamps or pipe staples, a thin strip of conductive metal 18 may be secured under the eyelet 14 on the opposite side of the plastic tube 13 from the bent metal tensioning piece 16, this thin metal strip 18 being wrapped about the tube or conduit as the clamp is applied thereto. It is an advantage to use a transparent type of resin plastic when bonding strips 18 are used, as by so doing the presence of the bond is visible to the inspector upon completion of the assembly.

In applying the clamp to a group of wires, tube, or conduit, the proper eyelet 15 is chosen so that as the fastening means 17 is screwed home the plastic tube 13 will be stretched and the tensioning piece 16 will be more acutely bent, as from the angle shown in Figure VI to that of Figure V for example, to apply both side and downward pressure to the object clamped. As the plastic tube is tensioned, both by screwing home the fastening 17, and by the pressure of the tensioning piece 16, the intervening length of plastic tube flattens into internal contact between bordering ridges 19, the ridges adding to the edge pressure of the clamp embracing the pipe or tube, and completely enveloping the bonding strip 18 if one is used.

I have found that by using a plurality of spaced eyelets 15 in the free end of the plastic tube that two sizes of clamps are adequate to securely hold all sizes of tubing and wire between three-sixteenths and one-inch in diameter, whereas fixed or preformed clamps would require eight sizes. In case one or more eyelets 15 project beyond the fastening means 17, the projecting or free end of the tube 13, as shown at 20 in Figures I, IV and V, can be cut off for neatness and to save weight.

By a suitable choice of the plastic material, size of plastic tube and wall thickness, the stretch imposed therein can be utilized to compress a group of loose wires into a compact bundle, and to firmly grip a tube or conduit; while providing a yielding and cushioned support preventing the transmission of vibrations, and the abrasion of the tube or conduit, as would be the case with a rigid metallic clamp or pipe staple.

It will thus be seen that I have invented an improved and simplified supporting clamp for the purpose specified that can readily be applied to a variety of sizes and types of tubing, pipe, conduit, electrical wiring or the like, wherein the object is resiliently supported and firmly gripped while cushioned relative to the supporting structure.

Having thus described my invention and the present preferred embodiments thereof, I desire to emphasize the fact that many modifications may be resorted to in a manner limited only by a just interpretation of the following claims.

I claim:

1. In a tube or wiring supporting clamp, a length of non-metallic, elastic tubing adapted to be wrapped around the tube or wiring under tension sufficient to approximately flatten the portion of the normally circular elastic tubing contacting the tube or wiring, eyelets secured near the ends of said elastic tubing, and fastening means extending through the eyelets and fastened to a support, said fastening means being adapted to maintain the tubing under tension due to the tendency of the tubing to recover its normally circular section in the portion thereof intermediate the eyelets.

2. In a tube or wiring supporting clamp, a length of non-metallic elastic tubing adapted to be wrapped around the tube or wiring under tension sufficient to approximately flatten the portion of the elastic tubing contacting the tube or wiring, eyelets secured near the ends of said elastic tubing, fastening means extending through the eyelets and fastened to a support, said fastening means being adapted to maintain the tubing under tension, and an angle plate secured under one eyelet and having an upstanding flange so constructed and arranged as to press against a portion of the elastic tubing in contact with the tube or wire being clamped, whereby to apply side and clamping pressure as the fastening means is tightened to a seat.

3. In a tube supporting clamp, a length of non-metallic elastic tubing characterized by resilient resistance to flattening thereof and adapted to be wrapped around the tube under tension sufficient to approximately flatten the portion of the elastic tubing contacting the tube, eyelets secured near the ends of said elastic tubing, fastening means being adapted to maintain the tubing under tension, and a bonding metal strip secured at one end under one of said eyelets and adapted to contact the supported tube beneath the elastic tube whereby to ground the supported tube through the eyelet and fastening means.

4. In a tube supporting clamp, a length of non-metallic elastic tubing adapted to be wrapped around the tube under tension sufficient to approximately flatten the portion of the elastic tubing contacting the tube, eyelets secured near the ends of said elastic tubing, fastening means adapted to maintain the tubing under tension, a bonding metal strip secured at one end under one of said eyelets and adapted to contact the supported tube beneath the elastic tube whereby to ground the supported tube through the eyelet and fastening means, and an angle plate secured under one eyelet and having an upstanding flange so constructed and arranged as to press against a portion of the elastic tubing in contact with the tube being clamped, whereby to apply side and clamping pressure as the fastening means is tightened to a seat.

5. A supporting clamp of the type described comprising a suitable length of non-metallic tubing of a tough resilient character, said tubing being of a normally circular section adapted to be wrapped and flattened under tension about an object to be supported, an eyelet clinched through opposite walls of said tubing at one end to flatten the same and define an aperture for a fastening device, and a series of similar eyelets spaced inward from the other end of the tube to flatten the same and to accommodate various sizes of objects to be supported.

6. A supporting clamp of the type described comprising a suitable length of non-metallic tubing of a tough resilient character, said tubing adapted to be wrapped and flattened under tension about an object to be supported, an eyelet clinched through opposite walls of said tubing at one end to flatten the same and define an aperture for a fastening device, a series of similar eyelets spaced inward from the other end of the tube to accommodate various sizes of objects to be supported, an angle plate secured under said eyelet having an upstanding flange so constructed and arranged as to press against a portion of the tubing in contact with the object being supported whereby to apply increased side and clamping pressure as the fastening device is tightened to a seat.

7. A supporting clamp of the type described comprising a suitable length of non-metallic tubing of a tough resilient character, said tubing adapted to be wrapped and flattened under tension about an object to be supported, an eyelet clinched through opposite walls of said tubing at one end to flatten the same and define an aperture for a fastening device, a bonding metal strip arranged between and parallel to the surface of the tube contacting said object, said bonding metal strip being grounded to said eyelet, and a series of similar eyelets spaced inward from the other end of the tube to accommodate various sizes of objects to be supported.

8. A supporting clamp of the type described comprising a suitable length of non-metallic tubing of a tough resilient character, said tubing adapted to be wrapped and flattened under tension about an object to be supported, an eyelet clinched through opposite walls of said tubing at one end to flatten the same and define an aperture for a fastening device, an angle plate secured under said eyelet having an upstanding flange so constructed and arranged as to press against a portion of the tubing in contact with the object being supported whereby to apply increased side and clamping pressure as the fastening device is tightened to a seat, a bonding metal strip arranged between and parallel to the surface of the tube contacting said object, said bonding metal strip being grounded to said eyelet, and a series of similar eyelets spaced inward from the other end of the tube to accommodate various sizes of objects to be supported.

HENRY F. REMPT.